Figure 5:
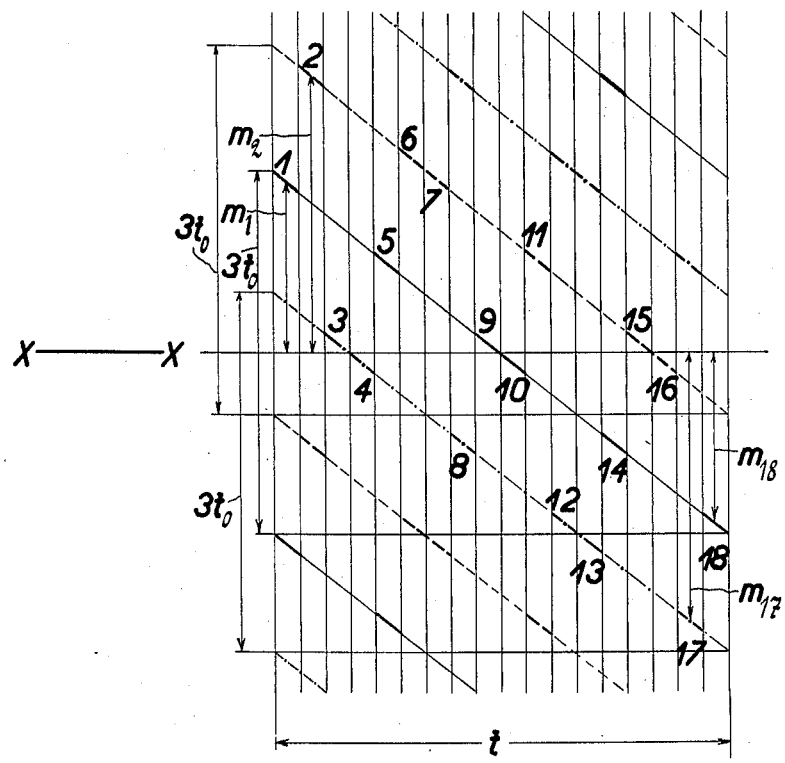

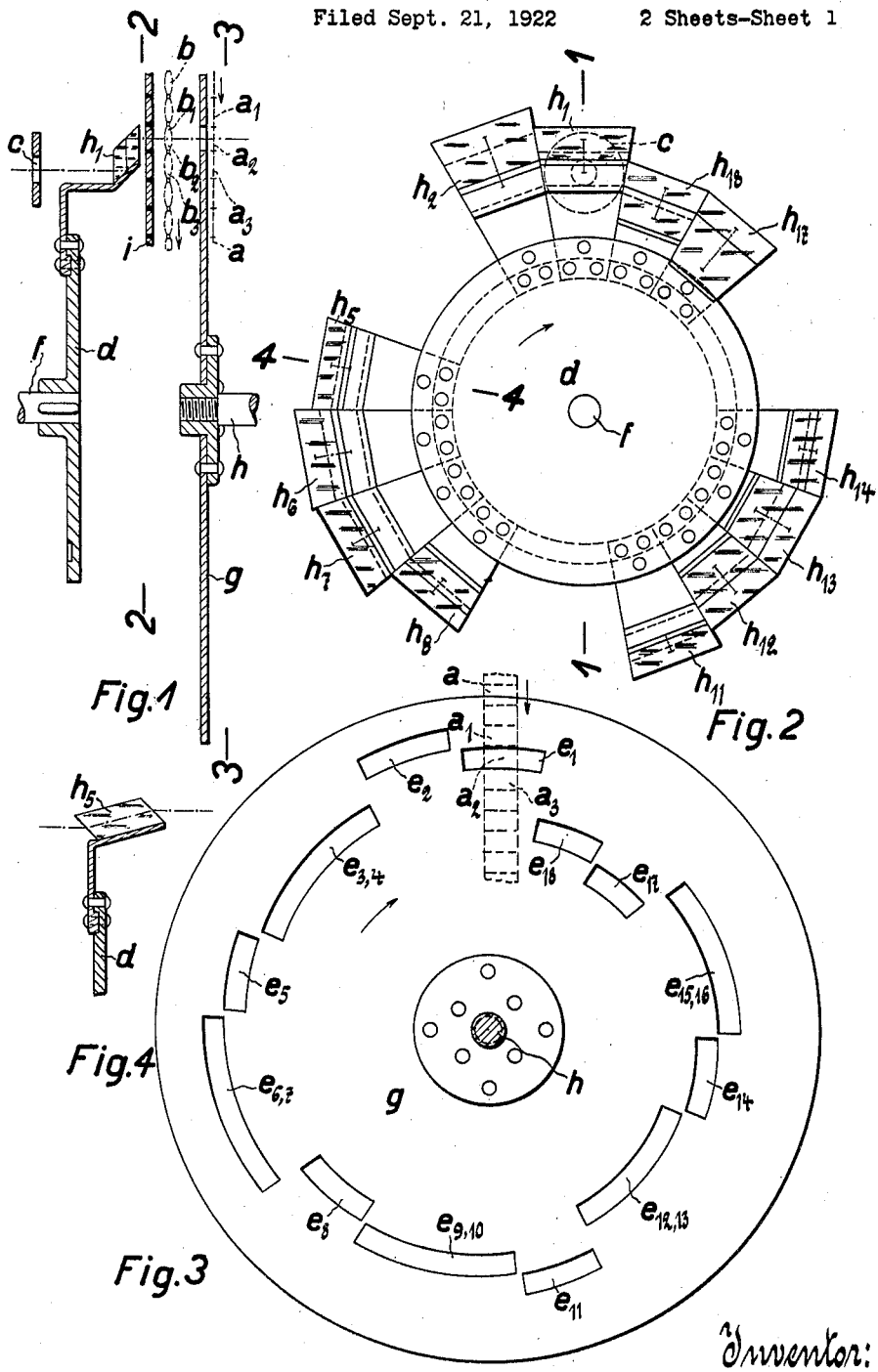

Patented Dec. 16, 1924.

1,519,105

UNITED STATES PATENT OFFICE.

WALTHER BAUERSFELD, OF JENA, GERMANY, ASSIGNOR TO THE FIRM CARL ZEISS, OF JENA, GERMANY.

DEVICE FOR MAKING CINEMATOGRAPHIC EXPOSURES.

Application filed September 21, 1922. Serial No. 589,673.

*To all whom it may concern:*

Be it known that I, WALTHER BAUERSFELD, a citizen of the German Empire, residing at Jena, Germany, have invented a new and useful Device for Making Cinematographic Exposures (for which I have filed an application in Germany Sept. 17, 1921), of which the following is a specification.

The present invention relates to a device for making cinematographic exposures of different colors by means of an apparatus fitted with several objectives and continuously moving film. According to the invention, in addition to the device serving for the compensation of the film movement means are used which cause each film picture during its presence in the field of rays several times now to receive the whole light entering the apparatus (naturally always in the color appertaining to the respective picture) and then to be cut off from the light. Thereby it is purported and fairly approximately attained to avoid the differences in the image, caused by the distance apart of the objectives, of the film pictures belonging to one group and corresponding to the different colors.

In the event of moved objectives the arrangement can be made in such a way that each objective will be once exposed to the light whilst its optical axis traverses the middle of the eight entrance openings whereby optical elements are saved.

In the annexed drawing Figs. 1 to 4 show as a constructional example of the invention an apparatus for cinematographic exposures of three different colors: Fig. 1 is a longitudinal section, Figs. 2 and 3 are cross sections on the lines 2—2 and 3—3 respectively of Fig. 1, Fig. 4 shows a detail, Fig. 5 is a diagram of the light distribution.

The continuously moved film is denoted by $a$. For the compensation of the film motion serves an endless chain of objectives $b$, moving at the speed of the film in front of the latter. Fig. 5 shows in which manner the light emanating from the light entrance opening $c$ (indicated by the principal ray X—X of the pencil of light containing the middle of the opening) is transmitted to three consecutive objectives $b_1$, $b_2$ and $b_3$ of the chain $b$ during a passage of these objectives through the field of rays. The oblique line corresponding in Fig. 5 to the objective $b_1$ is continuous, the one corresponding to the objective $b_2$ is dotted; the one corresponding to the objective $b_3$ consists partly of dots, partly of lines. The time $t$ of the passage of the three objectives (which, e. g. with fifteen exposures by means of each objective within a second amounts to $\frac{1}{15}$ second, during which time the objectives cover a distance equal the triple objective division 3 $t_0$; i. e. also equal to the triple film division) is divided into eighteen divisions. Light is imparted to the objective $b_2$ within the divisions of time 1, 5, 9, 10, 14 and 18, to the objective $b_1$ within the divisions of time 2, 6, 7, 11, 15 and 16 and to the objective $b_3$ within the divisions of time 3, 4, 8, 12, 13 and 17. The parallel displacements of the principal ray required within the parts 1, 2, 17 and 18 are denoted by $m_1$, $m_2$, $m_{17}$ and $m_{18}$. The middle of the light entrance opening $c$ is so positioned that within the six divisions of time 3, 4, 9, 10, 15 and 16 only a very slight displacement of the principal ray X—X would be necessary, which may therefore be dispensed with without doing any harm. With a view to attain the distribution of light shown in Fig. 5 there is disposed between the chain of objectives $b$ and the light entrance opening $c$ a disc $d$ which is fixed on a shaft $f$. The latter is assumed to be coupled to the film actuating mechanism in such a way as to undergo a rotation within a space of time, required by the film to move on by the triple amount of a film division (during which time the objectives move on by the same amount). In that case fifteen rotations of the shaft $f$ in a second correspond to fifteen exposures in a second by means of each objective. On the disc $d$ there are disposed eight rhombic prisms $h_1$, $h_2$, $h_6$, $h_7$, $h_{12}$, $h_{13}$, $h_{17}$ and $h_{18}$ as well as four planeparallel plates $h_5$, $h_8$, $h_{11}$ and $h_{14}$ in such a relative distribution that the distribution of light takes place according to Fig. 5. The slight displacements, which the principal ray X—X would have to undergo within the division of time 3, 4, 9, 10, 15 and 16, have in this case been neglected. On the corresponding places of the disc $d$ no deflecting optical element has been provided for, so that, on the field of rays being traversed by these places, the light entering through the opening $c$ is directly transmitted to the objective being behind the opening at any one time. Between the chain of objectives *b* and the disc *d* there is disposed a chain *i* of color filters, which moves through the field of rays at the same speed as the chain of objectives, in such a manner that to each of three consecutive objectives $b_1$, $b_2$ and $b_3$ light is imparted of only one of the three colors. In order that by each objective ($b_1$, $b_2, b_3 \ldots$) light is only imparted to the appertaining film picture ($a_1, a_2, a_3 \ldots$), a round disc *g* having suitably disposed openings $e_1 \ldots e_{18}$ has been provided for directly in front of the film *a*. This round disc is fixed on a shaft *h* which is assumed to be so coupled to the film actuating mechanism as to undergo the same number of revolutions in a second as the disc *d*. The directions of motion of the different chains and discs are indicated by arrows.

I claim:

1. In a device for making cinematographic exposures of different colors by means of a continuously moving film a light entrance opening, a plurality of objectives, a plurality of color filters, movably disposed within the path of the rays traversing the objectives, optical means adapted to compensate the film motion and operatively connected with the said color filters, and other optical means adapted to direct the light in such a way that each film picture during its presence in the field of rays several times now receives the whole light of the appertaining color, entering the apparatus and then is cut off from the light, the said color filters being operatively connected with the last named means in such a manner that each film picture only receives light of one and the same color.

2. In a device for making cinematographic exposures of different colors by means of a continuously moving film a light entrance opening, a plurality of objectives, a plurality of color filters, movably disposed within the path of the rays traversing the objectives, optical means adapted to compensate the film motion and operatively connected with the said color filters, a system of optical elements adapted to displace a luminous ray parallel to itself, this system being rotatably disposed in front of the objectives and controlled by the film actuating mechanism in such a way that its axis of rotation is parallel to the optical axes of the objectives, and being adapted to transmit during a passage of its elements through the field of rays several times alternately light to the objectives from the said light entrance opening, and a diaphragm device, this diaphragm device and the color filters being operatively connected with the said system in such a manner that each film picture only receives light of one and the same color.

3. In a device for making cinematographic exposures of different colors by means of a continuously moving film a light entrance opening, a plurality of objectives, the axes of which are parallel to each other and which are displaceable perpendicularly to the direction of their axis, a plurality of color filters, optical means adapted to compensate the film motion, a system of optical elements adapted to displace a luminous ray parallel to itself, this system being rotatably disposed in front of the objectives and controlled by the film actuating mechanism in such a way that its axis of rotation is parallel to the optical axes of the objectives, and being adapted to transmit during a passage of its elements through the field of rays several times alternately light in a mutiple turn to the objectives from the said light entrance opening, gaps between these elements allowing the light to pass through whenever the axis of an objective coincides with the middle of the light entrance opening, and a diaphragm device, this diaphragm device and the color filters being so disposed that each film picture only receives light of the appertaining definite color through the appertaining objective.

WALTHER BAUERSFELD.

Witnesses:
 PAUL KRIEGER,
 RICHARD HAHN.